P. MALMGREN.
GAMBREL.
APPLICATION FILED FEB. 19, 1910.
968,782.
Patented Aug. 30, 1910.
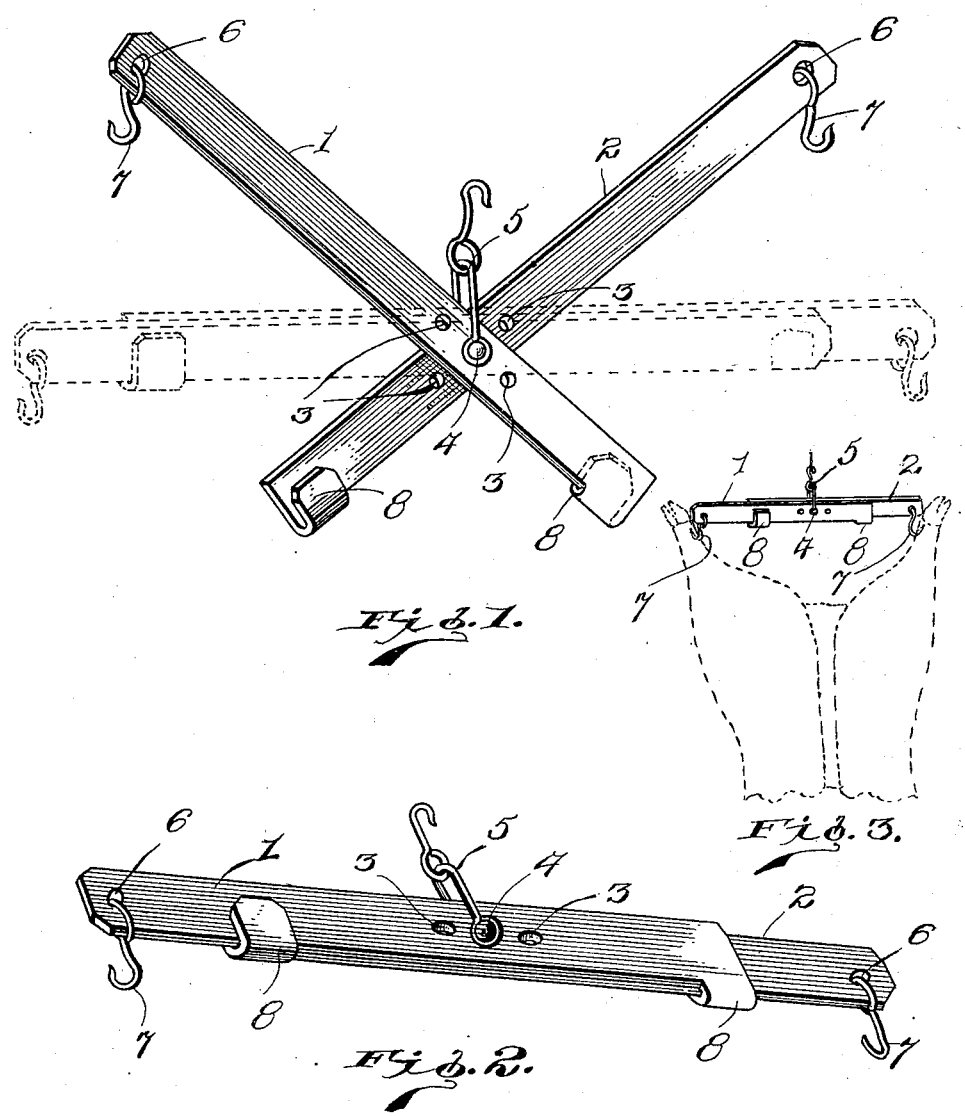
Witnesses
Inventor
Peter Malmgren.
his Attorney

UNITED STATES PATENT OFFICE.

PETER MALMGREN, OF DELAWARE, IOWA.

GAMBREL.

968,782.  Specification of Letters Patent.  Patented Aug. 30, 1910.

Application filed February 19, 1910. Serial No. 544,833.

*To all whom it may concern:*

Be it known that I, PETER MALMGREN, a citizen of the United States of America, residing at Delaware, in the county of Delaware and State of Iowa, have invented certain new and useful Improvements in Gambrels, of which the following is a specification, reference being had therein to the accompanying drawing.
This invention relates to gambrels or spreaders for separating suspended carcasses, and the principal object of the same is to provide a device of the character described in which the weight of the articles suspended from the gambrel will cause the same to automatically spread the suspending points of the gambrel and thereby separate the article suspended thereby.

Another object of the same is to provide a gambrel that is capable of being used in connection with heavy carcasses such as hogs and the like and which may also be used as a swingletree for vehicles.

In carrying out the objects of the invention generally stated above, it will be understood, of course, that the essential features thereof, are necessarily susceptible of changes in details and structural arrangements such as fall within the spirit and scope of the appended claims, one preferred and practical embodiment of which is shown in the accompanying drawings, wherein:—

Figure 1 is a perspective view of the improved gambrel, dotted lines being used for indicating the spreading position of the same. Fig. 2 is a similar view showing the gambrel in its spreading position and also in the position it would be in if used as a swingletree. Fig. 3 illustrates the gambrel as it would appear in operation.

Referring to said drawings by numerals, it will be seen that the improved gambrel is composed of two duplicate and preferably flat elongated sections 1—2 each being provided with a longitudinal row of regularly spaced apart transverse openings 3. As shown in the drawings, the two sections are held in pivotal and superimposed relation by a pivot bolt 4 that passes through two of the alined openings of said sections, said bolt having a clevis 5 projecting therefrom by means of which the gambrel may be suspended. At the outer end of each section, an eye 6 is formed from which a suspending hook 7 hangs.

The sections are preferably formed of steel or other strong metal, and have an extension projecting at right angles from the inner end of the lower longitudinal edge, which extension is bent over upon itself to provide a holding clip 8 for the reception of the longitudinal lower edge of the other member for firmly holding the same when the members have reached a parallel position as is shown in Fig. 2 of the drawings.

In use the gambrel is suspended from an overhead support by means of the clevis 5 and the carcass attached to the suspending hooks 7, the gambrel being in the position shown in Fig. 1. It will be seen that the weight of the carcass will rock the members to the parallel position shown in Fig. 2, thereby automatically spreading the carcass. It will be obvious that when the members reach their relative parallel position, said members will have an interlocking engagement through their clips 8 so that further spreading movement of said members is prevented. It will also be seen that the size of the gambrel may be varied by moving the pivot bolt 4 from the openings it is shown engaged with to another set of openings, thereby adapting the same for use with different sizes of carcasses. And it will also be seen that the members of the gambrel may be locked in parallel relation by means of suitable fastening means which may be passed through the openings 3 so that the gambrel may be pivotally connected to the running gear of a vehicle and serve as a swingletree.

What I claim as my invention is:—

1. A device of the character described comprising a pair of duplicate members, suspending means for holding said members in pivoted and relatively adjustable relation, and carcass suspending means carried by each member whereby said members are rocked to a parallel position by the weight of the carcass.

2. A device of the character described comprising two strips of metal, said strips provided with a series of openings near the center thereof, a supporting clevis adapted to adjustably join said strips, the inner end of each strip being provided with a supporting clip adapted to engage the other of said strips, and suspending hooks attached to the outer ends of said strips.

In testimony whereof I hereunto affix my signature in presence of two witnesses.

PETER MALMGREN.

Witnesses:
R. DAVIS,
H. BETTCHER.